United States Patent [19]

Montean

[11] 4,075,618
[45] Feb. 21, 1978

[54] MAGNETIC ASYMMETRIC ANTIPILFERAGE MARKER

[75] Inventor: Samuel Montean, Blaine, Minn.

[73] Assignee: Minnesota Mining and Manufacturing Company, St. Paul, Minn.

[21] Appl. No.: 705,419

[22] Filed: July 15, 1976

[51] Int. Cl.² .......................................... G08B 13/22
[52] U.S. Cl. ............................... 340/280; 324/262; 360/132; 340/258 R
[58] Field of Search .................. 340/280, 258 R; 324/34 S, 34 R; 360/132, 137

[56] References Cited

U.S. PATENT DOCUMENTS

| | | | |
|---|---|---|---|
| 3,747,086 | 7/1973 | Peterson | 340/280 |
| 3,820,104 | 6/1974 | Fearon | 340/280 |
| 4,000,488 | 12/1976 | Ephraim | 340/280 |

FOREIGN PATENT DOCUMENTS

| | | | |
|---|---|---|---|
| 763,681 | 5/1934 | France | 340/280 |

Primary Examiner—Glen R. Swann, III
Attorney, Agent, or Firm—Cruzan Alexander; Donald M. Sell; William B. Barte

[57] ABSTRACT

A widely accepted type of antipilferage system provides in an interrogation zone a magnetic field which periodically alternates at a predetermined frequency. Such systems further include means for detecting very high order harmonics of the predetermined frequency such as result from the presence within the zone of a marker having non-linear electrical or magnetic properties. In the present invention, such a marker includes an asymmetrically shaped piece or pieces of low-coercive force ferromagnetic material, including a center section and flux concentrator sections at opposite ends of the center section. Such a marker enables the protection of objects having a maximum dimension which is less than the length of prior art "open-strip" markers.

15 Claims, 9 Drawing Figures

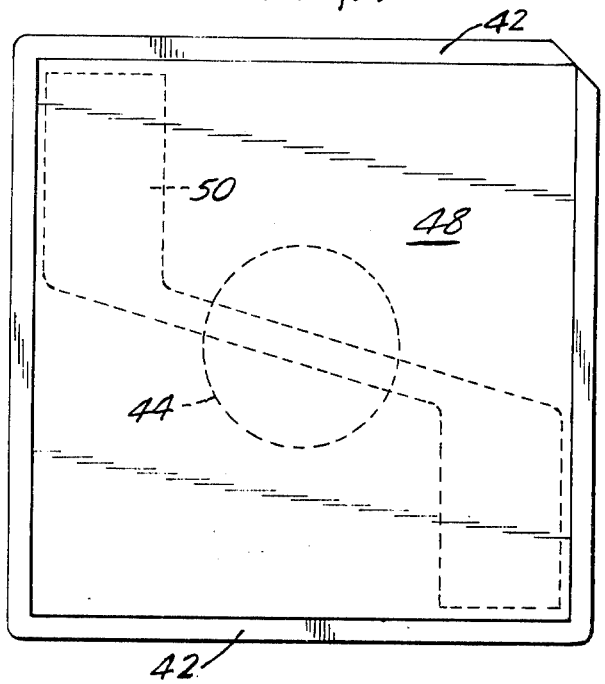
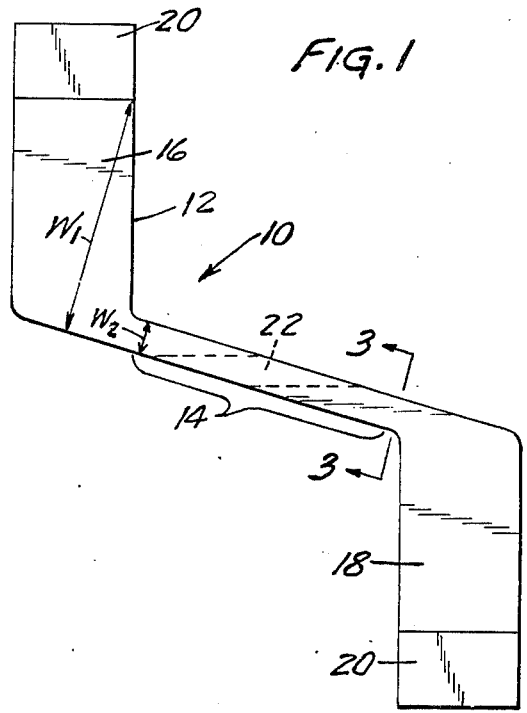
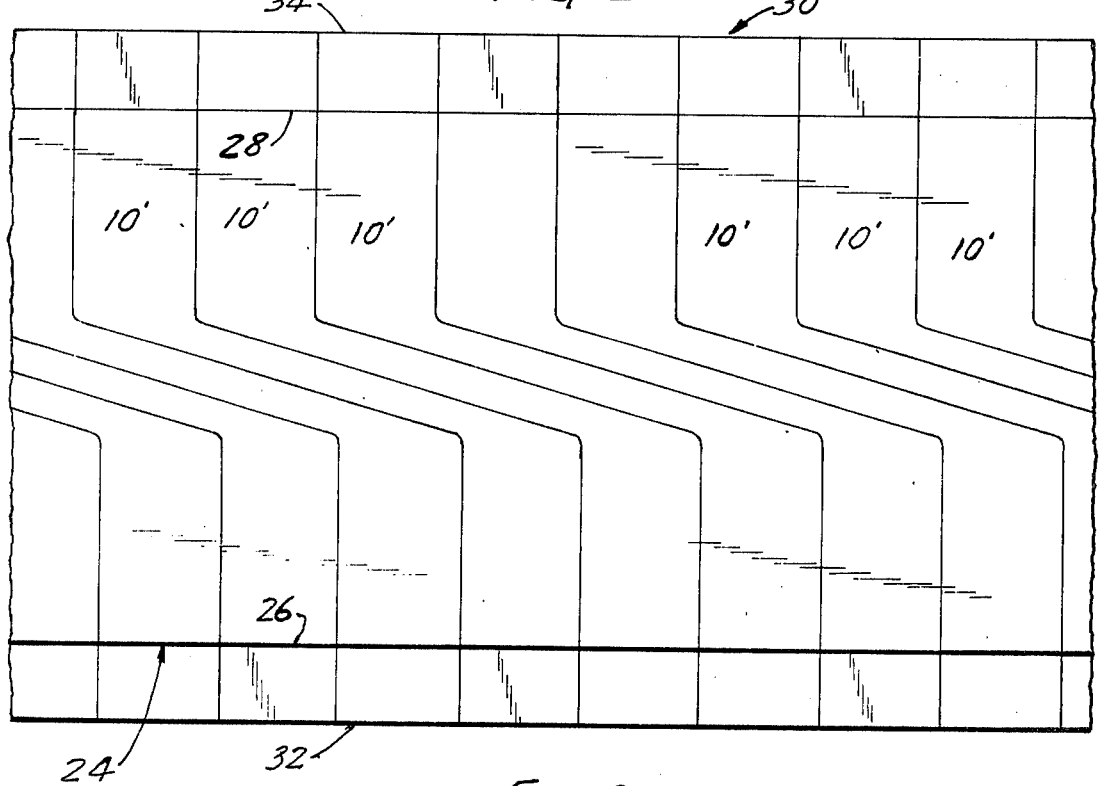
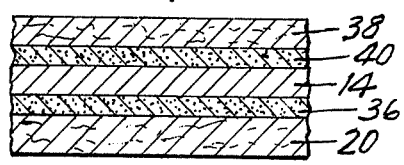

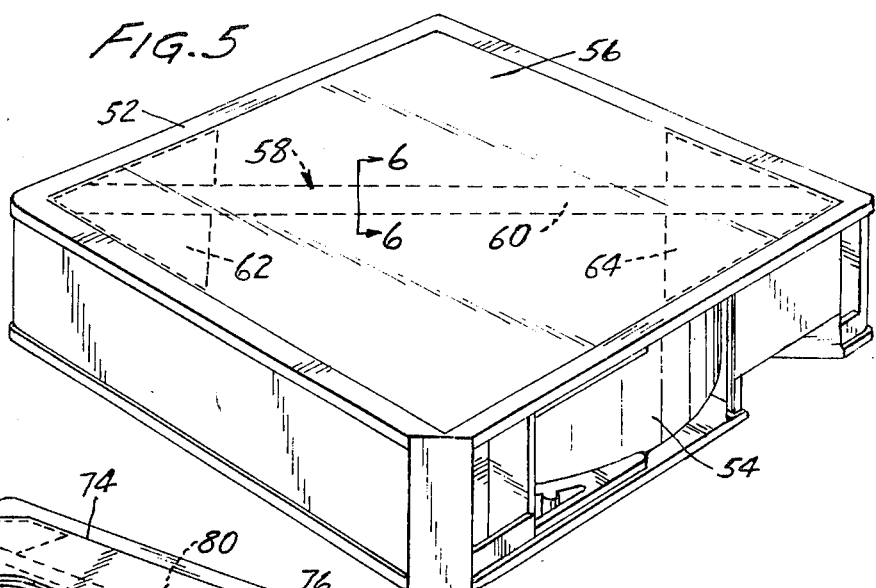
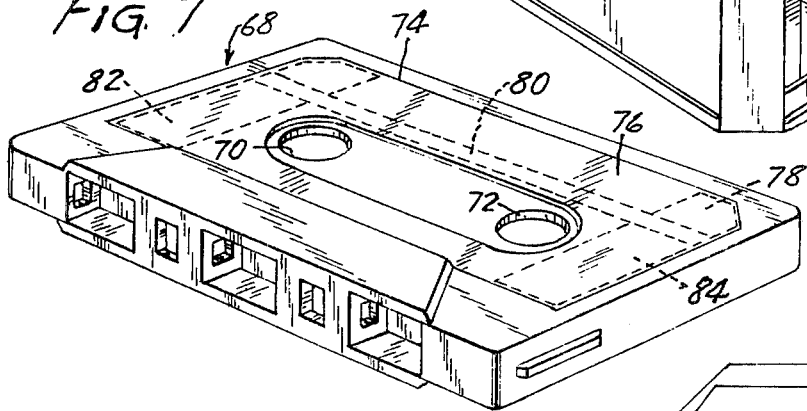
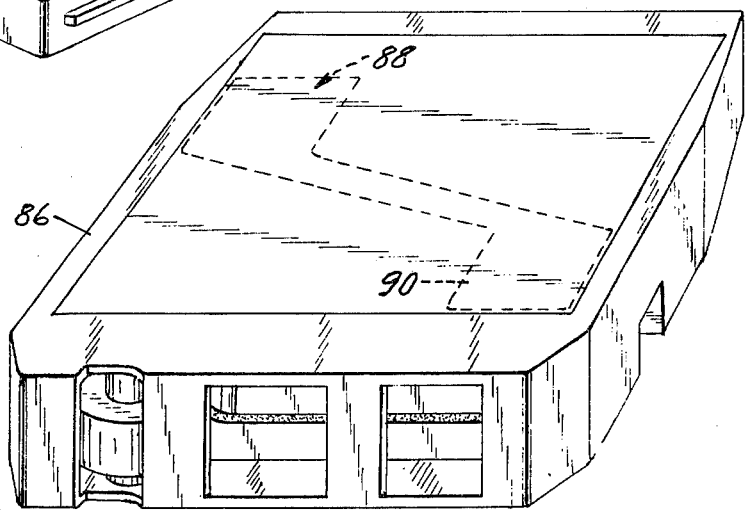
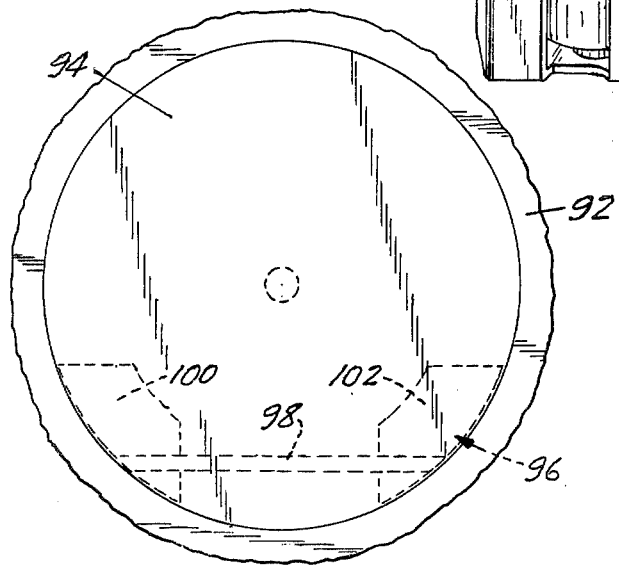
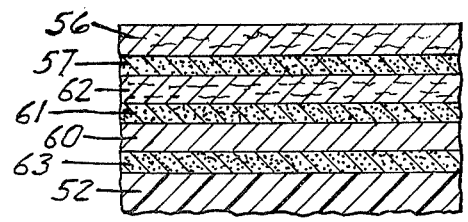

MAGNETIC ASYMMETRIC ANTIPILFERAGE MARKER

BACKGROUND OF THE INVENTION

1. Field of the Invention

This invention relates to antipilferage systems, particularly to such systems as utilize a marker containing a ferromagnetic material which is detected by subjecting the material to an alternating magnetic field and sensing the perturbations resulting from reversals of the magnetization of the material.

2. Description of the Prior Art

Antipilferage systems such as are useful in the remote detection of objects such as retail merchandise and library books as they pass through an interrogation zone are now well known. Perhaps beginning with a 1934 French Patent (French Patent No. 763,681, issued to Pierre Arthur Picard) and continuing through a number of recent U.S. patents, such as U.S. Pat. Nos. 3,665,449 (Elder and Wright) and 3,790,945 (Fearon), it is evident that investigators have appreciated that the presence of a marker may be uniquely distinguished from other even relatively common articles if one provides as a part of the marker a section of a high permeability ferromagnetic material. It has been appreciated that when the magnetization of such a material is reversed by a periodically alternating magnetic field such as provided in an interrogation zone through which the marker is passed, the magnetization reversal would result in the production of harmonics of the alternating field. The detection of the harmonics could then be used to indicate the presence of an object to which the marker is affixed.

More particularly, the recent U.S. patents reflect the discovery that if care is given to the shape of the ferromagnetic material, i.e., that if an "open-strip" is provided, very high order harmonics will be generated in a rapidly varying magnetic field. By "open-strip" is meant a section of material which when magnetized has separate poles, i.e., a strip which is not closed or wound upon itself, and which preferably has a ratio of length to square root of cross sectional area of at least 150. Such a discovery has resulted in the development of an antipilferage system such as disclosed in Elder et al which has enjoyed considerable commercial success, but which has heretofore been limited to protecting objects shaped such that a linearly extending marker approximately 7 inches (18 cm) long could be affixed thereto. Correspondingly, such a system has not heretofore been useful with objects such as microfilm cartridges and magnetic recording cassettes in which the objects did not extend over such linear dimensions. The need to also protect such objects makes it desirable to have a shorter marker which would produce the same response in the interrogating field provided in previously installed systems. The French Patent referenced hereinabove suggests that a metal piece employing polar extensions, such as are shown in FIG. 7 of that reference may be provided to increase the sensitivity of the apparatus. However, there is no indication in that specification of any appreciation of any manner by which very high order harmonics could be generated. Rather, that reference indicates that the size of the metal body used as the marker varies only the amplitude of the received wave, not the order of the harmonic. Such increases in size, be they shaped as polar extensions or whatever, do not suggest a capability of protecting small objects.

SUMMARY OF THE INVENTION

This invention includes a marker which overcomes the aforesaid limitations, namely that it may be affixed to small objects which heretofore could not be protected by prior art ferromagnetic antipilferage markers. The marker of the present invention is adapted for use in a system for sensing the presence of an object to which is affixed the marker in an interrogation zone having therein a magnetic field periodically varying at a predetermined fundamental frequency. The marker is shaped of asymmetric sections of ferromagnetic material including a center section having a permeability if not less than $10^4$ and a coercive force of not more than 0.5 oersted, together with two substantially planar flux concentrator sections having a permeability of not less than 10% the permeability of the center section and a coercive force of not more than one oersted. Each of the flux concentrator sections is secured to an end of the center section such that a low reluctance path exists therebetween. The concentrator sections each have a predetermined area, the maximum dimension of which parallel to the width of the end portion of the center section to which it is secured is at least three times the width of the end portion. Magnetic lines of flux are accordingly collected and concentrated in the center section when a marker is present in a magnetic field periodically alternating at a predetermined frequency such that an effective field of sufficient intensity is impressed on the center section to cyclically reverse the magnetization. Such reversals result in the production of a detectable characteristic signal containing harmonics of the predetermined frequency in excess of the twentieth order.

The marker preferably includes a layer of pressure sensitive adhesive affixed to one surface of the sections to enable the ferromagnetic sections to be secured to the objects to be detected, and may include a layer having low adhesive characteristics affixed to the other surface of the adhesive layer to protect it prior to the application of the marker to an object to be protected against pilferage. Another layer may also be affixed to the opposite surface of the sections to stiffen the marker so as to avoid mechanical working of the ferromagnetic material prior to the application thereof onto an object. Such a layer may also be utilized to receive printed indicia for enabling visual identification of an object to which it is affixed and for concealing the sections to minimize their detection and conspicuity. Alternatively, a separate printed label may be applied on top of the stiffening layer.

In a preferred embodiment, the marker is asymmetrically shaped to conform with an irregularly shaped object such as a microfilm cartridge or magnetic recording cartridge or cassette to which it is desirably affixed. In such an embodiment, the center and flux concentrator sections of the marker correspond to the shape of a substantially planar portion of the irregularly shaped objects and do not extend into other portions of the irregularly shaped objects so as to obstruct or interfere with access thereto.

Unlike the markers disclosed in U.S. Pat. Nos. 3,665,449 and 3,790,945, the markers of the present invention are not required to be of the "open-strip" configuration, and yet have been found to produce appropriate characteristic signals containing very high order harmonic components such that they are useful in a system designed for use with such open-strip markers.

The extension of such a system to enable the protection of objects to which the "open-strip" markers could not be secured is thus effected.

Such a system has found considerable commercial success in protecting objects which are intended for public use, and which are also thus subject to pilferage. Library books are exemplary of such objects. However, libraries, and other information depositories, are increasingly utilizing audio/visual equipment and offer for public use pre-recorded magnetic tape cassettes, microfilm records in preloaded cartridges, calculators, etc., all of which objects have been found not to be amendable to the use of the prior art "open-strip" markers. There has, therefore, arisen a need for an improved marker to protect such objects, which marker is compatible with existing antipilferage systems. The marker of the present invention fulfills just such a need.

BRIEF DESCRIPTION OF THE DRAWING

FIG. 1 is a top view of a marker of the present invention;

FIG. 2 is a top view of a succession of markers similar to that shown in FIG. 1, indicating the manner in which they may be formed from a single sheet of material;

FIG. 3 is a cross section of the marker taken along the lines 3—3 shown in FIG. 1;

FIG. 4 is a top view of a 16 mm microfilm cartridge on which is concealed a marker such as that shown in FIGS. 1–3;

FIG. 5 is a perspective view of another microfilm cartridge on which is concealed another marker of the present invention;

FIG. 6 is a sectional view taken along lines 6—6 of the marker and cartridge shown in FIG. 5;

FIG. 7 is a perspective view of a conventional magnetic recording cassette on which is concealed another embodiment of a marker of the present invention;

FIG. 8 is a perspective view of a conventional 8-track magnetic recording cassette on which is concealed a marker such as shown in FIGS. 1–4; and FIG. 9 is a top view of a section of a phonograph record on which is concealed another embodiment of a marker of the present invention.

DESCRIPTION OF THE PREFERRED EMBODIMENTS

In one embodiment of the present invention shown in FIG. 1, a marker 10 includes an "S" shaped asymmetric piece 12 of a high permeability ferromagnetic material such as Permalloy. The piece 12 includes a center section 14 and flux concentrator sections 16 and 18, respectively. Such a marker further includes a layer of pressure sensitive adhesive (not shown), which layer is protected by a layer 20 such as a release liner having low adhesive characteristics prior to the application of the marker to an object to be protected. The marker also includes a paper layer adhesively secured to the top of the ferromagnetic sections to protect the sections from mechanical deformation such as is known to lower the permeability of the sections. When the marker is to be applied, the layer 20 is removed from the adhesive layer and the marker thereupon affixed to the object. The layer 20 desirably extends beyond the end of the flux concentrator sections 16 and 18 to enable the ready removal thereof.

In many of the applications to which the markers of the present invention are especially suited, it is anticipated that the objects are not intended to be removed or circulated. Accordingly, a "single-status" permanently sensitized marker is suitable for those applications. However, in certain other applications, a "dual-status" marker may be desired so as to enable the object to be checked out and thereafter passed through interrogation zones without producing an alarm. The marker shown in FIG. 1 is such a "dual-status" marker and includes another section 22 of ferromagnetic material such as Vicalloy, a magnetic alloy consisting of 52% Co, 10% V and 38% Fe. Such a material has a higher coercive force than the material utilized in the center section 14, and when magnetized acts to alter the harmonic content of the characteristic signal produced by the center section 14. Such dual-status markers are more fully described in U.S. Pat. No. 3,665,449.

The relative dimensions of the center section 14 and of the flux concentrator sections 16 and 18 of the marker 10 of the present invention, such as that shown in FIG. 1, as well as the material from which they are fabricated have been found to be significant. In order to appreciate this significance, it is useful to first consider an "open-strip" marker of the prior art. Such a marker typically has dimensions of 7 inches by ¼ inch by 0.001 inch (180 × 7 × 0.025 mm), and exhibits a length to square root of cross sectional area in excess of approximately 400. The demagnetizing factor associated therewith results in the effective permeability of the strip to be appreciably the same as the actual permeability thereof, such as that measured with, for example, a toroid or needle shaped sample. This high effective permeability and the low coercive force associated with the material, such as permalloy, which is desirably used in such an "open-strip" marker results in a rapid switching of the material when a rapidly alternating magnetic field is impressed upon the material. Very high order harmonics of the alternating magnetic field are thereby produced.

In contrast to such an "open-strip" marker, the center section 14 of the marker 10 of the present invention is not sufficiently elongated so as to be considered an "open-strip". Rather, the dimensions of the center section 14 are such that the demagnetizing factor associated therewith would result in an effective permeability sufficiently low that the requisite high order harmonics would not be produced in the relatively low fields of most detection systems. However, the production of such high order harmonics is now appreciated to be dependent not only upon the effective permeability of the marker, but also on the intensity of the field to which the marker is exposed. Accordingly, in the present invention, the marker is designed such that any decrease in the sensitivity of the marker as might be attributed to a decrease in the effective permeability is offset by an increase in sensitivity provided by the flux concentrator elements 16 and 18. These elements collect and concentrate the field into the center section 14. The resultant effective field impressed thereon is sufficiently large to enable the production of a detectable characteristic signal containing the requisite very high order harmonics.

The relative dimensions of the flux concentrator sections 16 and 18 can accordingly be altered, depending upon the dimensions of the center section 14, in order to provide a marker having the capability of responding in a manner similar to that of a longer open-strip marker, thereby providing compatibility with systems designed for use with such open-strip markers. In any event, as shown in FIG. 1, it has been found that the width ($W_1$)

of the flux concentrator sections 16 and 18 should be at least three times the width ($W_2$) of the center section 14.

Regarding the materials from which the respective sections of the marker of the present invention may be fabricated, it is appropriate to first consider the types of materials from which the center section 14 may be constructed. The reversal of the magnetization of this section is believed to be primarily responsible for the production of the characteristic signal containing the high order harmonics. It has been found that the center section 14 is preferably formed of materials similar to that used in the "open-strip" markers of the present invention, i.e., of a very high permeability material such as Permalloy, an alloy of iron and nickel containing not less than 30% nickel, having a coercivity of not greater than 0.5 oersted, and preferably having coercive forces in the range of 0.02 oersted. The actual permeability of such a material is desirably in the range of $10^6$. Other materials having suitable magnetic characteristics include Supermalloy, "METGLAS", an amorphous metallic alloy having low coercive force and high permeability, manufactured by the Allied Chemical Company, and "Mark II Permalloy" such as that manufactured by Carpenter Technology, Inc. Permalloy which has been annealed after it has been fabricated into the desired shapes to further enhance the permeability may be particularly desired.

In contrast to the fairly rigid requirements of the center section 14, the flux concentrator sections 16 and 18 may be formed of less esoteric and similarly of less expensive ferromagnetic materials. Since these materials are not required to be magnetically cycled to saturation during an interrogation, the coercive force of the suitable materials may be in excess of that useful for the center section 14. Similarly, the permeability of the flux collector sections 16 and 18 may be considerably less than that provided in the center section 14. Materials having a permeability as low as 10% of that of the center section 14 have been found to be acceptable. For example, silicon-steel such as that used in transformer applications having a permeability of 7,000 has been found to be marginally useful. However, it is preferred that a material having a permeability in excess of $10^4$ be utilized. Inasmuch as the materials used in the center section 14 desirably have a permeability of approximately $10^6$, the requisite ratio of permeabilities may be seen to be readily provided.

While it has been shown that the center section 14 and the flux collector sections 16 and 18 may be formed of different materials which are then joined together to provide a low reluctance magnetic path therebetween, it is preferable that all sections be formed of a single sheet. Such a formation enables significant economy in the production of the markers. FIG. 2 shows a manner in which a succession of such markers is desirably formed from such a single sheet. FIG. 2 depicts a web of Permalloy 24 extending between bounds 26 and 28 on opposite sides, extending over an indefinite length in the longitudinal direction. A layer of pressure sensitive adhesive is provided beneath the web (not shown) and a layer 30 having low adhesion characteristics extending between the transverse boundaries 32 and 34 is provided on the opposite surface of the adhesive layer. A compound cutter may then be provided to die stamp a succession of markers 10' from the web as there depicted, the shape of the markers being designed so as to produce substantially zero waste between successive markets. Such a marker is designed to include the flux concentrator sections 16 and 18 of FIG. 1, having substantially opposed end portions, one end portion of each concentrator section being continuous with an end portion of the center section 14. The other end portions of both concentrator sections terminate in substantially linear edges which are substantially parallel to each other, and which correspond to the edges 26 and 28 of the web 24. The opposing side edges of all sections correspond to each other, i.e., have substantially the same shape, such that a succession of markers may be formed from a sheet having a width equal to the distance between the linear edges of the flux concentrator sections without appreciable waste material left over.

A cross section of the marker shown in FIG. 1 is shown in FIG. 3, wherein the ferromagnetic center section 14 is shown to have a layer of pressure sensitive adhesive 36 secured thereto, which layer is in turn protected by the low adhesive release-liner 20. An adhesive-liner combination is conveniently in the form of an adhesive transfer tape such as Type 465, manufactured by Minnesota Mining and Manufacturing Company, St. Paul, Minnesota. The marker further desirably includes a paper stiffening layer 38 such as a medium weight bond paper. The layer 38 is secured to the ferromagetic section 14 by an adhesive layer 40 such as the adhesive transfer tape described hereinabove.

A typical example in which a marker of the present invention has great utility is in protecting preloaded 16 mm microfilm cartridges. Such a cartridge is shown in FIG. 4 and includes a housing 42 which has an opening 44 on one surface enabling a drive spindle to be inserted therethrough. The opposite top surface is planar and is adapted to have adhered thereto a label 48 carrying printed indicia identifying the contents of the cartridge. Such a surface also provides a ready location for the placement of the marker of the present invention. Such a marker 50 is shown affixed to the top surface of the housing. The label 48 is placed on top of the marker 50 so as to conceal the marker, rendering it inconspicuous. Because the characteristics of the marker, i.e., the permeability of the ferromagnetic sections, may be degraded by mechanical working, it may be preferable to first install the marker 50 onto the surface. The label 48 may be preprinted and installed on top of the marker 50 such that the mechanical impact as may be present during the printing onto the label 48 does not mechanically work and thereby alter the magnetic characteristics of the marker 50.

Another view of a microfilm cartridge is shown in perspective view in FIG. 5. In this embodiment, the microfilm cartridge housing 52 is shown to contain a reel of microfilm 54 and to have concealed below a label 56 another embodiment of a marker 58 of the present invention. The marker 58 includes a center section 60 and two triangular shaped flux concentrator sections 62 and 64. Such a marker is desirably placed diagonally on the housing 52 so as to maximize the length of the center section 60. While such a marker may thus be preferable in that the center section 60 more closely approximates an "open-strip" marker, such a marker may be undesirable in that it is more expensive to fabricate and may result in appreciable waste material.

The combined articles of FIG. 5 are shown in cross sectional view in FIG. 6, wherein the label 56 is shown secured to the marker 58 via a layer of pressure sensitive adhesive 57. The marker is there more clearly shown to include the center section 60 secured via a second layer of pressure sensitive adhesive 61 to a stiffening layer 62 and via a third layer of pressure sensitive adhesive 63 to the housing 52.

FIG. 7 shows a perspective view of another embodiment of the present invention in which the markers are designed to be used in a conventional magnetic recording cassette. In this embodiment, a cassette housing 68 having openings 70 and 72 through which spindles may be inserted to drive reels (not shown) located within the housing 68, is further provided with a recessed portion 74 such that a label 76 identifying the information recorded on the tape within the housing may be secured thereto. As in the embodiments described hereinabove, a marker 78 may be secured between the housing 68 and the label 76. In this embodiment, the marker is provided with a center section 80 and flux collector sections 82 and 84, which extend substantially perpendicular to the center section 80. Such a marker is constructed in substantially the same manner as the markers described hereinabove.

FIG. 8 is a perspective view of another embodiment of the markers of the present invention, in which the markers are adapted to be secured to a conventional 8-track magnetic recording cartridge. In this embodiment, the cartridge housing 86 is provided with a marker 88 such as that shown in FIGS. 1-3, affixed to an inside surface of the housing, thus providing increased protection against the marker being detected and removed. Such an embodiment also emphasizes a desirable aspect of the marker and system in which such a marker is to be used, i.e., that the marker is not easily shielded. Even though relatively weak magnetic fields are present in an interrogation zone, such fields, as well as the characteristic signals generated by the markers, readily penetrate materials such as injection molded plastics and the like as are used for the housing of typical cassettes and cartridges. This embodiment also indicates that a marker such as that described in conjunction with FIGS. 1-3 is readily adaptable to be used in a variety of articles. Similarly, the marker may be positioned within or on a housing such that one of the flux collector sections is not co-planar with the center section and the other flux collector section. For example, in the embodiment shown in FIG. 8, the flux collector section 90 may be installed such that that section extends down one wall of the housing 86. Such a positioning may be particularly desirable in certain applications where the size of the object to be detected precludes the use of the marker having all sections co-planar. Such an application may further be desirable in that it extends the directional response of the marker.

As shown in FIG. 9, phonograph records are also desirably protected by the markers of the present invention. In this embodiment, a phonograph record 92 is shown to have a center portion in which a conventional label 94 is secured. A specially designed marker 96 is shown to be affixed to the record between the main surface and the label 94. In this embodiment, the center section 98 extends between flux collector sections 100 and 102, which sections are in the shape of circular sections so as to maximize the length of the center section 98 while yet allowing the marker to be concealed within the circular label 94.

While but a few typical articles to which the asymmetric markers of the present invention may be affixed have been shown in the figures described hereinabove, it will be appreciated that such markers are desirably used in conjunction with a great variety of other articles. For example, miniaturized electronic calculators, objets d'art, office supplies and equipment may similarly be protected. Similarly, while a dual-status marker has been shown only in conjunction with FIG. 1, it will readily be appreciated that at least one additional ferromagnetic element may be provided with the markers shown in all of the remaining embodiments such that either single-status or dual-status markers may be provided.

As discussed hereinabove, the marker of the present invention may readily be detected pursuant systems such as those disclosed in U.S. Pat. Nos. 3,631,442 (Fearon), 3,665,449 (Elder and Wright), 3,747,086 (Peterson) and 3,790,945 (Fearon). In the systems there described, a magnetic field alternating at a predetermined frequency, is generated by suitable field producing means, such as conventional coils and power supplies, and is impressed upon an interrogation zone. Such a field may generally alternate at a frequency in the range of 60 to 10,000 hertz and may have a peak amplitude in the vicinity of the interrogation zone of approximately 20 oersteds, and a minimum amplitude of less than one oersted. The field generally decreases toward the center of the interrogation zone as one moves away from the field generating coils. Higher fields are thus desired in the vicinity of the field producing coils such that a minimum field will exist everywhere within the interrogation zone, thereby ensuring reliable detection of the marker. Such systems further include means for detecting the characteristic signal, such as a conventional detection coil which is positioned adjacent the interrogation zone, and which is coupled to electronic sensing apparatus. The sensing apparatus desirably has frequency selective components to enable the detection of very high order harmonics of the fundamental frequency. Preferred embodiments of such systems may also include timing circuits and/or circuits requiring the presence of a successive train of the characteristic signals in order to further enhance the reliability of the system and thereby minimize false alarms. Such features are all now well known to those skilled in the art and need no further description herein.

Having thus described the present invention, what is claimed is:

1. An antipilferage marker adapted for use in a system for sensing the presence of an object to which is affixed a said marker in an interrogation zone having therein a magnetic field periodically varying at a predetermined fundamental frequency, said marker comprising asymmetric sections of ferromagnetic material including a center section having end portions and having a permeability of not less than $10^4$ and a coercive force of not more than 0.5 oersted, and two substantially planar flux concentrator sections having a permeability of not less than 10% of the permeability of the center section and a coercive force of not more than one oersted, one of which concentrator sections is secured to each end portion of the center section such that a low reluctance path exists therebetween, said concentrator sections having a predetermined area, the maximum dimension of which parallel to the width of the end portion of the center section to which it is secured is at least three times the width of said end portion such that magnetic lines of flux are collected and concentrated in the center section when a magnetic field periodically alternating at a predetermined frequency is impressed on the marker so as to provide an effective field impressed upon the center section of sufficient intensity to cyclically reverse the magnetization of the center section to result in the production of a detectable characteristic signal containing harmonics of the predetermined frequency in excess of the twentieth order.

2. A marker according to claim 1, further comprising a layer of pressure sensitive adhesive affixed to one side of the ferromagnetic sections for enabling the secural thereof to objects to be detected.

3. A marker according to claim 2, further comprising a layer having low-adhesive characteristics affixed to the other side of the pressure sensitive adhesive layer for protecting the adhesive layer prior to the application thereof to a said object.

4. A marker according to claim 1, further comprising a relatively stiff layer affixed to the sections, stiffening said sections to prevent mechanical deformation thereof prior to application of the sections to a said object.

5. An antipilferage marker according to claim 1, wherein said marker is shaped to correspond to portions of an irregularly shaped object to which it is desirably affixed, such that the marker does not extend into other portions of said irregularly shaped object so as to obstruct or interfere with access thereto.

6. A marker according to claim 1 wherein said marker is shaped to correspond to portions of a microfilm or magnetic recording cassette or cartridge housing such that said concentrator sections are positioned with respect to said center section to correspond to unobstructed planar portions of the housing.

7. A marker according to claim 1, wherein said marker further comprises at least one additional ferromagnetic element disposed adjacent to and generally aligned with the center section, said additional element having a coercivity greater than that of the center section, wherein magnetization of the additional element alters the harmonic content of the said characteristic signal produced by said center section.

8. A marker according to claim 1, wherein said center section is formed of a material having a permeability of not less than $10^6$.

9. A marker according to claim 1, wherein said center section is formed of an alloy of nickel and iron containing not less than 30% nickel.

10. A marker according to claim 1, wherein all sections of the marker are formed of an alloy of nickel and iron containing not less than 30% nickel.

11. A marker according to claim 10, wherein all sections are formed of a single sheet of an alloy of nickel and iron containing not less than 30% nickel.

12. A marker according to claim 1, wherein said marker is formed of a ferromagnetic sheet material having a given thickness, wherein said marker has a given overall width and length, and wherein said flux concentrator sections have substantially opposed end portions, one end portion of each concentrator section being secured to an end portion of the center section such that low reluctance paths exist therebetween, and the other end portions of both concentrator sections terminating in substantially linear edges which are substantially parallel to each other thereby defining the said given overall length, the opposing sides of all sections defining said overall width having substantially the reverse configuration such that a succession of markers may be formed from a sheet having a width equal to the distance between the linear edges of the flux concentrator sections without appreciable waste material left over.

13. An antipilferage marker adapted for use in a system for sensing the presence of an object to which is affixed a said marker in an interrogation zone having therein a magnetic field periodically varying at a predetermined fundamental frequency, said marker comprising sections of ferromagnetic sheet material of a given thickness and having a given overall length and width, said marker further comprising a substantially planar center section of ferromagnetic material having a permeability of not less than $10^4$ and a coercive force of not more than 0.5 oersted, said center section having end portions and side portions extending therebetween and two substantially planar flux concentrator sections of ferromagnetic material having a permeability of not less than 10% of the permeability of the center section and a coercive force of not more than one oersted, said flux concentrator sections having substantially opposed end portions, one end portion of each concentrator section being secured to an end portion of the center section such that low reluctance paths exist therebetween, and the other end portions of both concentrator sections terminating in substantially linear edges which are substantially parallel to each other thereby defining said given overall length, the opposing sides of all sections defining said overall width having substantially the reverse configuration such that a succession of markers may be formed from a sheet having a width equal to the distance between the linear edges of the flux concentrator sections without appreciable waste material left over.

14. A cassette or cartridge housing adapted to enclose at least one reel containing a ribbon-like media such as microfilm or magnetic recording tape, said housing having affixed thereto an antipilferage marker to enable the detection of said housing in an interrogation zone having therein a magnetic field periodically varying at a predetermined fundamental frequency, said marker comprising a piece of a ferromagnetic material having a permeability of not less than $10^4$ and a coercive force of not more than 0.5 oersted, the dimensions of which piece are shaped to provide a center section and flux concentrator sections secured to the ends of the center section to collect and concentrate magnetic flux into the center section, said concentrator sections having a predetermined area, the maximum dimension of which parallel to the width of the end of the center section to which it is secured is at least three times the width of said end such that when a magnetic field periodically alternating at a predetermined frequency is impressed on the marker, an effective field is impressed upon the center section of sufficient intensity to cyclically reverse the magnetization of the center section to result in the production of a detectable characteristic signal containing harmonics of the predetermined frequency in excess of the twentieth order.

15. A method for making an antipilferage marker adapted for use in a system for sensing the presence of an object to which a said marker is affixed when the object is in an interrogation zone having a magnetic field periodically varying at a predetermined fundamental frequency, said method comprising a. providing a web of ferromagnetic material having a permeability of not less than $10^4$ and a coercive force of not greater than 0.5 oersted, b. affixing a layer of pressure sensitive adhesive to one side of said web, c. affixing a layer having low-adhesive characteristics to the other side of said pressure sensitive adhesive, d. cutting the assembled ferromagnetic web and layers affixded thereto into discrete markers having a center section extending at least partially longitudinally to the web and having flux concentrator sections at both ends, the maximum dimension of the concentrator sections parallel to the length of the web being at least three times the width of said center section, said concentrator sections being displaced longitudinally with respect to each other such that successive and adjacent markers are substantially identical and are formed without any waste material remaining between adjacent markers.

* * * * *

UNITED STATES PATENT AND TRADEMARK OFFICE
CERTIFICATE OF CORRECTION

PATENT NO. : 4,075,618
DATED : February 21, 1978
INVENTOR(S) : Samuel Montean

It is certified that error appears in the above-identified patent and that said Letters Patent are hereby corrected as shown below:

Column 12, beginning with line 10, add new claim 16 as follows:

-- 16. An asymmetric antipilferage marker adapted for use in a system for sensing the presence of an object to which is affixed a said marker in an interrogation zone having therein a magnetic field periodically varying at a predetermined fundamental frequency, said marker comprising one piece of a ferromagnetic material having a permeability of not less than $10^4$ and a coercive force of not more than 0.5 oersted, the dimensions of which piece are shaped to provide a narrow center section and enlarged integral flux concentrator sections, one at each end of the center section, to collect and concentrate magnetic flux into the center section, said concentrator sections having a predetermined area, the width of which is at least three times the width of said center section such that when a magnetic field periodically alternating at a predetermined frequency is impressed on the marker, an effective field is impressed upon the center section of sufficient intensity to cyclically reverse the magnetization of the center section to result in the production of a detectable characteristic signal containing harmonics of the predetermined frequency. -- .

Signed and Sealed this

Tenth Day of July 1979

[SEAL]

Attest:

LUTRELLE F. PARKER

Attesting Officer
*Acting Commissioner of Patents and Trademarks*